M. F. DONAHAE.
TRAP NEST.
APPLICATION FILED MAR. 6, 1914.
1,135,441.
Patented Apr. 13, 1915.
2 SHEETS—SHEET 1.
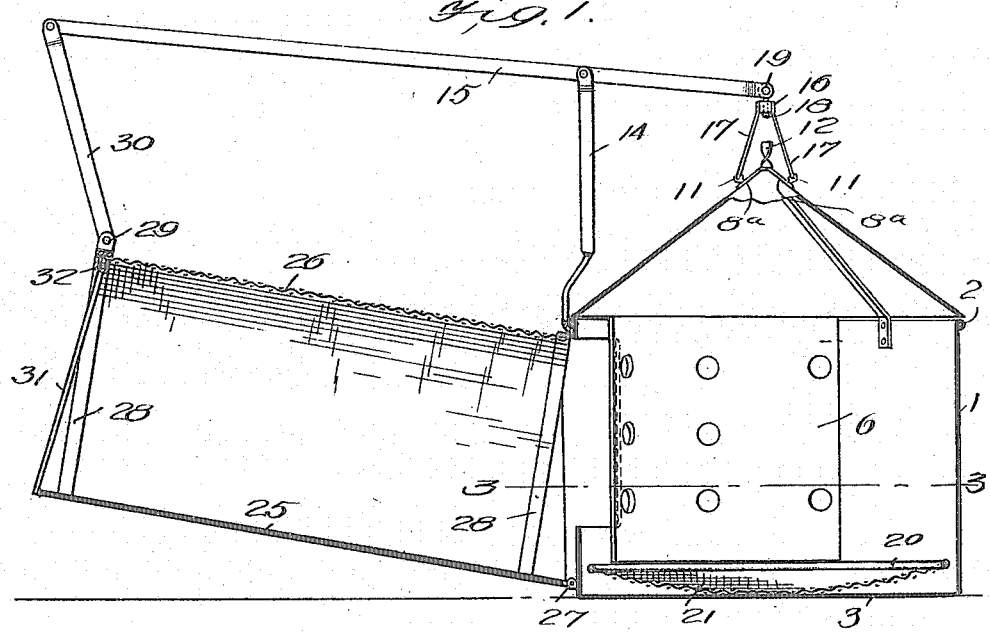
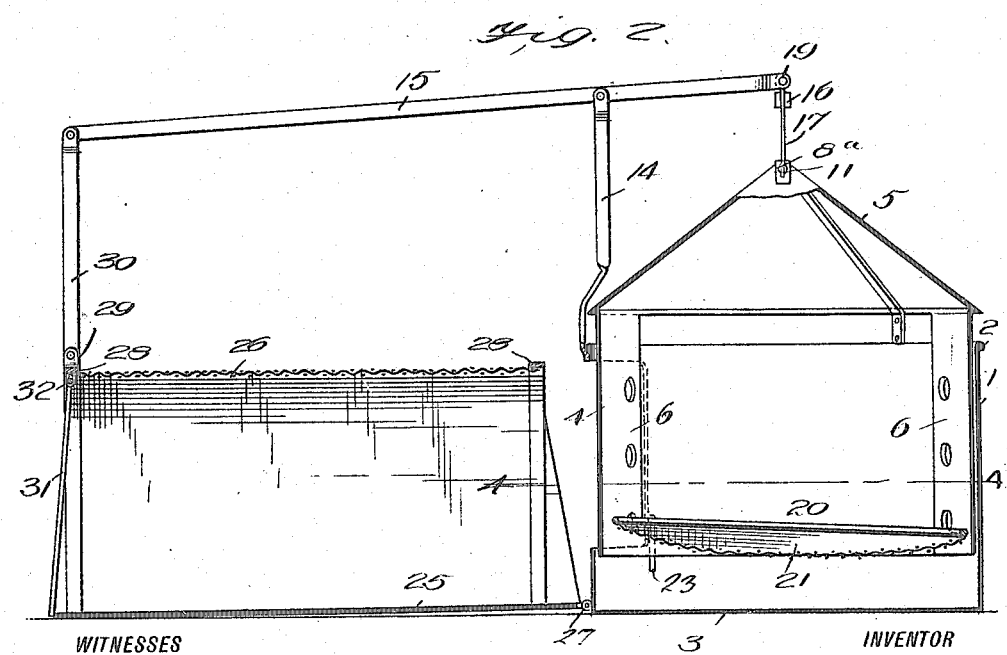
WITNESSES
F. C. Berry
C. E. Brown
INVENTOR
Myrt F. Donahae
BY Munn & Co.
ATTORNEYS
THE NORRIS PETERS CO., PHOTO-LITHO., WASHINGTON, D. C.

M. F. DONAHAE.
TRAP NEST.
APPLICATION FILED MAR. 6, 1914.
1,135,441.
Patented Apr. 13, 1915.
2 SHEETS—SHEET 2.
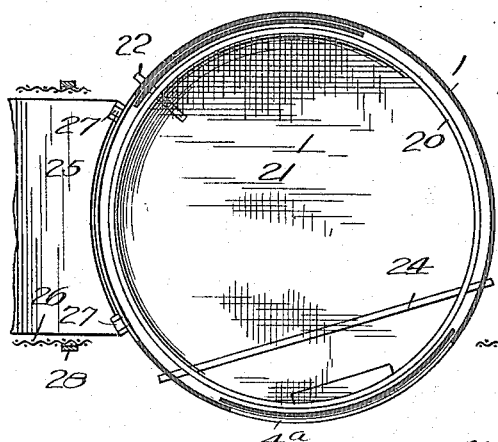
Fig. 3.
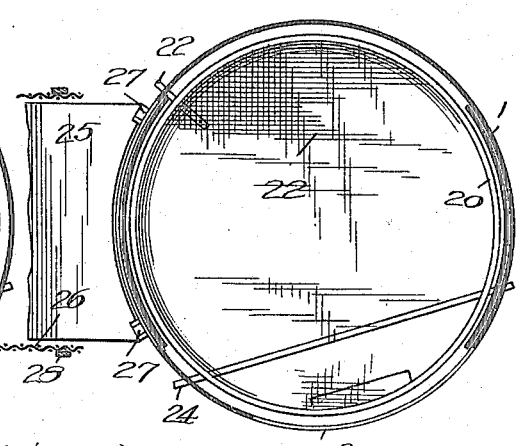
Fig. 4.
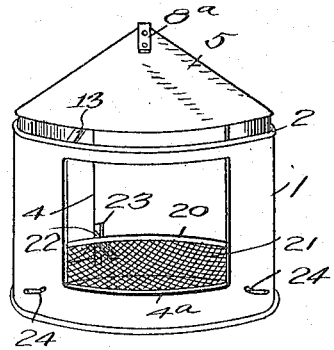
Fig. 5.
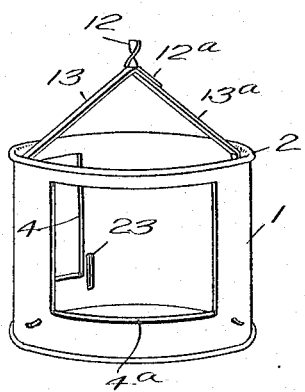
Fig. 6.
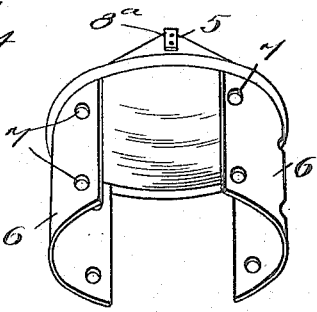
Fig. 7.
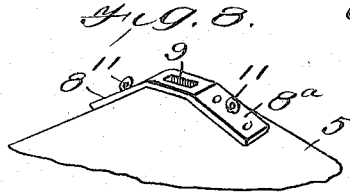
Fig. 8.
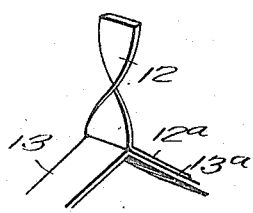
WITNESSES
F. E. Barry
C. E. Tramin
INVENTOR
Myrt F. Donahae
BY Munn & Co.
ATTORNEYS
THE NORRIS PETERS CO., PHOTO-LITHO., WASHINGTON, D. C.

UNITED STATES PATENT OFFICE.

MYRT FLORIN DONAHAE, OF PROVIDENCE, RHODE ISLAND.

TRAP-NEST.

1,135,441.     Specification of Letters Patent.     Patented Apr. 13, 1915.

Application filed March 6, 1914. Serial No. 822,995.

*To all whom it may concern:*

Be it known that I, MYRT F. DONAHAE, a citizen of the United States, and a resident of Providence, in the county of Providence and State of Rhode Island, have invented a new and useful Improvement in Trap-Nests, of which the following is a specification.

My invention is an improvement in trap nests, and has for its object to provide a device of the character specified, wherein a nest is provided for the use of the fowl, and wherein an inclosure is provided for the nest having an entrance and an exit, and wherein doors are provided for the entrance and the exit, and mechanism in connection with the doors for normally closing the door of the exit and opening the door of the entrance and arranged to be operated by the weight of the fowl as it enters the nest for closing the door of the entrance and opening the door of the exit.

In the drawings:—Figure 1 is a longitudinal section of the improved nest showing the parts in one position, Fig. 2 is a similar view with the parts in another position, Fig. 3 is a section on the line 3—3 of Fig. 1, Fig. 4 is a section on the line 4—4 of Fig. 2, Fig. 5 is a perspective view of the nest, and with the cover in place, Fig. 6 is a similar view with the cover and the nest support removed, Figs. 5 and 6 looking from above, Fig. 7 is a view similar to Fig. 6, from the opposite side and looking from below, and Fig. 8 is an enlarged detail perspective view of the cover and its support.

The present embodiment of the invention comprises an outer casing consisting of a body 1 of approximately cylindrical form, having its upper edge beaded as shown at 2, and having a bottom 3. Openings 4 and $4^a$ are provided in the body of sufficient size to permit the passage of the fowl from and to the nest, the said openings being at right angles to each other. The top of the body 1 is open and the nest support is mounted for vertical movement in the outer casing.

The door support comprises a top 5 of conical form from which depends two transversely arched door plates 6, each of which is provided with openings 7, the said openings being at the side edges and intermediate the side edges of the plates. The plates are oppositely arranged as shown, and are connected with the cover in any suitable manner.

A plate is secured to the top of the cover at the apex thereof, the said plate consisting of portions 8 and $8^a$. The portion 8 is provided with a longitudinally extending slot 9, and the portions $8^a$ are arranged at an obtuse angle to the portion 8, and each of the said portions is secured to the top 5, by means of rivets 10 or the like, and each of the said portions is provided on its outer face with an eye 11.

The top 5 is slotted in register with the slot 9 of the portion 8 of the plate, and the said slot is adapted to receive a spirally twisted cam 12, which is connected to the body 1 of the outer casing, by means of an angular bail, consisting of two portions 13 and $13^a$, arranged at approximately a right angle to each other.

The cam 12 is provided with an extension $12^a$, which laps upon the portion $13^a$ of the bail and is secured thereto in any suitable manner, and the free end of each of the portions 13 and $13^a$ of the bail is connected to the inner surface of the body 1 of the outer casing. A bracket arm 14 is connected with the body 1 of the outer casing at approximately the center of the opening 4, and the said arm extends upwardly above the apex of the top 5 of the door support when the said top is in its highest position.

A lever 15 is pivoted to the bracket arm intermediate the ends of the lever, and one end of the lever is connected to the door support by means of a yoke-shaped hanger consisting of a body 16 and depending arms 17. The body 16 is provided with a central opening, through which extends the body of an eye bolt 18, the eye of the bolt being pivoted to the adjacent end of the lever 15 as indicated at 19. The lower end of the eye bolt is headed below the body of the yoke, and the arms 17 engage the eyes 11 of the portions $8^a$ of the plate 8—$8^a$. The yoke and the arms, together with the door support, are thus rotatably connected with the lever for rotating movement on a vertical axis. They are also connected to the lever to move vertically with the lever, and without interfering with the rotating movement. The cam 12 by its engagement with the slot 9 causes the door support to rotate as the support moves vertically. The cam is fixed and it will be obvious that as the support moves vertically it will be rotated by the cam.

The nest is composed of a ring 20 of wire or the like, to which is connected a covering 21 of perforate material, as for instance, wire gauze or chicken wire, and the ring 20 is of a size to fit between the plates 6. The ring is provided with a radial lug 22, which is adapted to engage a vertical slot 23 in the body of the outer casing 1, and a rod 24 is provided for supporting the other side of the ring, the lug 22 by its engagement with the bottom of the slot 23 supporting the ring at that side adjacent to the lug.

Any suitable material may be placed on the gauze 21 to provide a soft surface for the fowl to rest upon, and the nest is mounted to swing on the rod 24. A weight $24^a$ is connected to the ring on the opposite side of the rod from the lug 22, and the nest is so arranged in the outer casing that the weight $24^a$ is at the door $4^a$. The weight $24^a$ normally swings the nest on the rod 24 to cause the lug 22 to engage with the upper end of the slot 23. When the fowl steps on the nest through the doorway $4^a$, the opposite side of the nest from the door opening is depressed, the lug 22 moving down to the lower end of the slot 23.

The slot 23 is arranged near the side of the door opening 4 as will be evident from an inspection of Figs. 5 and 6, and the said lug is in position to engage the edge of one of the plates 6 to prevent the said plate or door from moving away from over the door opening 4 until the nest is swung to move the lug downwardly to release the door plate 6.

When the fowl steps upon the nest, the lug 22 releases the door plate 6, and the door support is released so that it may swing to cause one door plate to close the opening $4^a$ and to cause the other door plate to move from before the opening 4. The ends of the rod 24 engage bearing openings in the body 1 of the outer casing.

A runway is arranged at the opening 4 for permitting the fowl to leave the nest. The runway comprises a bottom 25 of imperforate material which is hinged to the body 1 of the outer casing at the opening 4, as indicated at 27. A body 26 of perforate material is connected with the bottom, the body being of U shape as shown, and the said body is reinforced at each end by an arch bar 28. The arch bar at the outer end of the runway is provided with a lug 29 at its top to which is pivoted one end of a link 30, the other end being pivoted to the adjacent end of the lever 15. A gate 31 is arranged at the end of the runway remote from the nest, the gate being arranged to normally stand closed but in such manner that it may be lifted to permit the fowl to pass out from the runway.

The operation of the device is as follows:— The nest is set or arranged for use by turning the door support to cause one of the doors 6 to cover the opening 4 and to cause the other door 6 to uncover the opening $4^a$. As soon as the door over the opening 4 is in place, the weight $24^a$ will tilt the nest to cause the lug 22 to engage the adjacent edge of the door over the opening 4 and the parts will be held in this position as shown in Fig. 2.

In order to cause one of the plates or doors 6 to cover the opening 4, it is necessary to lift the door support upwardly, the cam 12 rotating the door support to bring one of the plates or doors 6 over the opening 4. The nest is now in position to permit the fowl to enter the opening $4^a$. As soon as the fowl steps upon the nest or upon that portion of the nest on the inner side of the rod 24, the nest is tilted to cause the lug 22 to release the door 6, that is over the opening 4, and the weight of the door support and connected parts swings the lever 15 to raise the outer end of the runway.

As the door support swings, the door over the opening 4 is moved from over this opening and the other door is moved over the opening $4^a$. The fowl now cannot pass out by way of the opening $4^a$ but must leave the nest by way of the opening 4 and through the runway. As the fowl passes outwardly, her weight will swing down the outer end of the runway into the position of Fig. 2, thus swinging the opposite end of the lever 15 upwardly and returning the parts to set position. That is, as the door support moves upwardly, the spiral cam 12 rotates the support to move one of the doors over the opening 4 and to move the other door from over the opening $4^a$.

As soon as the one door has moved over the opening 4 the lug 22 is moved upward by the weight $24^a$, thus locking the door support with the opening $4^a$ open and the opening 4 closed. In using the improved nest, the door opening $4^a$ would open into one inclosure and the door opening 4 or the outer end of the runway into another so that after the fowl has laid an egg, she is transferred into another inclosure.

A close track may thus be kept of the different fowls to permit the non-producers to be weeded out. It is obvious also that the fowls might be divided in accordance with the size of the eggs laid. After one fowl has laid an egg, she cannot again return to the nest until returning to the first inclosure.

I claim:—

1. A device of the character specified, comprising an outer casing having an open top and having door openings arranged at a right angle with respect to each other, a door support mounted for vertical and for rotating movement in the outer casing and provided with depending doors at opposite sides of the support, a runway having an open end next the casing hinged to the outer casing at one of the door openings, a bracket extending upwardly from the outer casing at the door opening adjacent to the runway, a lever pivoted to the bracket intermediate its ends, a connection between the outer end of the runway and the adjacent end of the lever, a connection between the opposite end of the lever and the door support for constraining the door support to move with the lever and for permitting the door support to rotate on a vertical axis with respect to the lever, a nest within the outer casing, said nest being mounted to swing on an axis transverse to the nest and to the outer casing, the nest having means for engaging one of the depending doors when the door is over the opening adjacent to the runway to hold the door over the said opening and to prevent the door support from rotation, means for normally holding the nest in the said position, the nest being arranged to release the door by the weight of the fowl, and a connection between the door support and the outer casing for constraining the support to rotate when it moves vertically, the runway being mounted to normally overbalance the door support.

2. A device of the character specified, comprising an outer casing having door openings at right angles to each other, a door support mounted to rotate and to move vertically in the casing, a runway hinged to the outer casing at one door opening, a lever pivoted at one end to the door support and at the other to the outer end of the runway, and supported intermediate its ends for rocking movement, the runway normally overbalancing the door support, said door support having depending oppositely arranged doors to alternately close the door openings, a nest supported in the outer casing and mounted to swing on an axis transverse to the nest, a weight connected with the nest at the door opening remote from the runway and normally depressing the edge of the nest adjacent to the last-named door opening, said nest having means for engaging one of the depending doors and for holding the door support with the one door over the opening adjacent to the runway, the nest being adapted to release the door when the fowl steps thereon, and a connection between the door support and the outer casing for constraining the door support to rotate in a direction to open the door opening at the runway and to close the door remote therefrom when the door support is moved upwardly by the runway, said connection comprising a spiral cam supported above the upper casing, the door support having a slot through which the cam extends, and a gravity closed door at the outer end of the runway.

3. A device of the character specified, comprising an outer casing having door openings at right angles to each other, a door support mounted to rotate and move vertically in the casing, a runway hinged to the outer casing at one door opening, a lever pivoted at one end to the door support and at the other to the outer end of the runway, and supported intermediate its ends for rocking movement, the runway normally overbalancing the door support, said door support having depending oppositely arranged doors to alternately close the door openings, a nest supported in the outer casing and mounted to swing on an axis transverse to the nest, a weight connected with the nest at the door opening remote from the runway, and normally depressing the edge of the nest adjacent to the last-named door opening, said nest having means for engaging one of the depending doors and for holding the door support with the one door over the opening adjacent to the runway, the nest being adapted to release the door when the fowl steps thereon, and a connection between the door support and the outer casing for constraining the door support to rotate in a direction to open the door opening at the runway and to close the door remote therefrom when the door support is moved upwardly by the runway, and a gravity closed door at the outer end of the runway.

4. A device of the character specified, comprising an outer casing having door openings at right angles to each other, a door support mounted to rotate and to move vertically in the casing, a runway hinged to the outer casing at one door opening, a lever pivoted at one end to the door support and at the other to the outer end of the runway, and supported intermediate its ends for rocking movement, the runway normally overbalancing the door support, said door support having depending oppositely arranged doors to alternately close the door openings, a nest supported in the outer casing and mounted to swing on an axis transverse to the nest, a weight connected with the nest at the door opening remote from the runway, and normally depressing the edge of the nest adjacent to the last-named door opening, said nest having means for engaging one of the depending doors and for holding the door support with the said door over the opening adjacent to the runway, the nest being adapted to release the door when the fowl steps thereon, and a connection between the door support and the outer casing for constraining the door support to rotate in a direction to open the door opening at the runway and to close the door remote therefrom when the door support is moved upwardly by the runway.

5. A device of the character specified, comprising an outer casing having door openings at right angles to each other, a door support mounted to rotate in the casing and to move vertically with respect thereto and having oppositely arranged depending doors for alternately closing the door openings, a runway hinged to the casing at one door opening and extending radially therefrom, a connection between the outer end of the runway and the door support for constraining the door support to move upwardly when the outer end of the runway moves downwardly, the runway normally holding the door support lifted, a connection between the door support and the casing for constraining the support to rotate when it moves vertically, and a nest mounted for rocking movement in the outer casing and normally holding the door support with the door over the opening at the runway and adapted to release the said door when rocked by the weight of the fowl, and means for preventing the return of the fowl through the runway.

6. A device of the character specified, comprising an outer casing having door openings at right angles to each other, a door support mounted to rotate in the casing and to move vertically with respect thereto and having oppositely arranged depending doors for alternately closing the door openings, a runway hinged to the casing at one door opening and extending radially therefrom, a connection between the outer end of the runway and the door support for constraining the door support to move upwardly when the outer end of the runway moves downwardly, the runway normally holding the door support lifted, a connection between the door support and the casing for constraining the support to rotate when it moves vertically, and a nest mounted for rocking movement in the outer casing and normally holding the door support with the door over the opening at the runway, and adapted to release the said door when rocked by the weight of the fowl.

7. A device of the character specified, comprising an outer casing having a plurality of door openings and a door support mounted to rotate and to move vertically in the casing, and having doors arranged to alternately close the door openings when the support is rotated, a runway hinged to the outer casing at one door opening, a connection between the outer end of the runway and the door support for constraining the door support to move upwardly when the outer end of the runway moves downwardy, the runway normally holding the door support lifted, a connection between the door support and the outer casing for constraining the support to rotate when it moves vertically, a nest within the outer casing, and trip mechanism in connection with the nest for holding the door support with a door closing the opening adjacent to the runway, said mechanism being adapted to be operated by the entrance of a fowl on to the nest.

8. A device of the character specified, comprising an outer casing having a plurality of door openings and a door support mounted to rotate and to move vertically in the casing, and having doors arranged to alternately close the door openings when the support is rotated, a runway at one door opening, a balanced connection between the runway and the door support for lifting the door support when the runway is depressed, means for constraining the door support to rotate as it moves upwardly, the runway normally over balancing the door support, and trip mechanism for holding the door support with the door before the opening at the runway, and adapted to be released by the fowl.

9. A device of the character specified, comprising an outer casing having a plurality of door openings, and a door support mounted to rotate in the casing and having doors arranged to alternately close the door openings when the support is rotated, a run-way at one door opening, and means arranged between the run-way and the door support for rotating the support when the run-way is depressed by the weight of a fowl, and trip mechanism for holding the door support with the door before the opening at the run-way, said trip mechanism being adapted to be released by the weight of the fowl.

10. A device of the character specified, comprising an outer casing having a plurality of door openings, and a door support mounted to rotate in the casing and having doors arranged to alternately close the door openings when the support is rotated, a run-way at one door opening, and means operatively connecting the run-way and the door support for rotating the support when the run-way is depressed by the weight of a fowl.

MYRT FLORIN DONAHAE.

Witnesses:
SYLVESTER T. GROSS,
E. D. ANTHONY.

Copies of this patent may be obtained for five cents each, by addressing the "Commissioner of Patents Washington, D. C."